(12) United States Patent
Gopisetty et al.

(10) Patent No.: US 8,374,928 B2
(45) Date of Patent: Feb. 12, 2013

(54) DATA CENTER POWER COST ACCOUNTING SYSTEM

(75) Inventors: Sandeep Gopisetty, Morgan Hill, CA (US); Nagapramod Mandagere, San Jose, CA (US); Sandeep Madhav Uttamchandani, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 376 days.

(21) Appl. No.: 12/713,134

(22) Filed: Feb. 25, 2010

(65) Prior Publication Data

US 2011/0208622 A1 Aug. 25, 2011

(51) Int. Cl.
*G07B 17/00* (2006.01)

(52) U.S. Cl. ............................ 705/30; 705/348; 705/412

(58) Field of Classification Search .................. None
See application file for complete search history.

(56) References Cited

U.S. PATENT DOCUMENTS

| | | | |
|---|---|---|---|
| 7,197,433 B2 * | 3/2007 | Patel et al. ..................... 702/188 |
| 7,373,268 B1 * | 5/2008 | Viredaz et al. ................. 702/130 |
| 7,580,901 B2 * | 8/2009 | Johnson et al. ................ 705/400 |
| 7,881,910 B2 * | 2/2011 | Rasmussen et al. .............. 703/1 |
| 7,958,219 B2 * | 6/2011 | Collins et al. .................. 709/223 |
| 7,962,769 B1 * | 6/2011 | Patel et al. ..................... 713/300 |
| 8,001,403 B2 * | 8/2011 | Hamilton et al. ............. 713/320 |
| 2003/0177406 A1 * | 9/2003 | Bradley et al. ................ 713/300 |
| 2004/0163001 A1 * | 8/2004 | Bodas ........................... 713/300 |
| 2009/0138313 A1 * | 5/2009 | Morgan et al. ..................... 705/8 |
| 2010/0082309 A1 * | 4/2010 | Dawson et al. .................... 703/6 |
| 2011/0016342 A1 * | 1/2011 | Rowan et al. .................. 713/340 |
| 2011/0077795 A1 * | 3/2011 | VanGilder et al. ............ 700/300 |

* cited by examiner

*Primary Examiner* — Faris Almatrahi
(74) *Attorney, Agent, or Firm* — GSS Law Group

(57) ABSTRACT

A data center power cost accounting system uses server and storage and cooling power consumption models and device maps, together with runtime application maps, to estimate the equipment power consumption and cooling power consumption of individual applications. An approximation of the cooling cost over a period of time, for any given application, can be pieced together by adding up the equipment utilized by the application and applying the cooling estimates obtained from computational fluid dynamics (CFD) simulations. The cooling estimates can further account for changes or variability in resource usage over time since the cooling estimates are based directly on utilization. The per application power consumption costs are obtained without having to install or depend on power measurement instruments or other hardware in the datacenters.

20 Claims, 2 Drawing Sheets

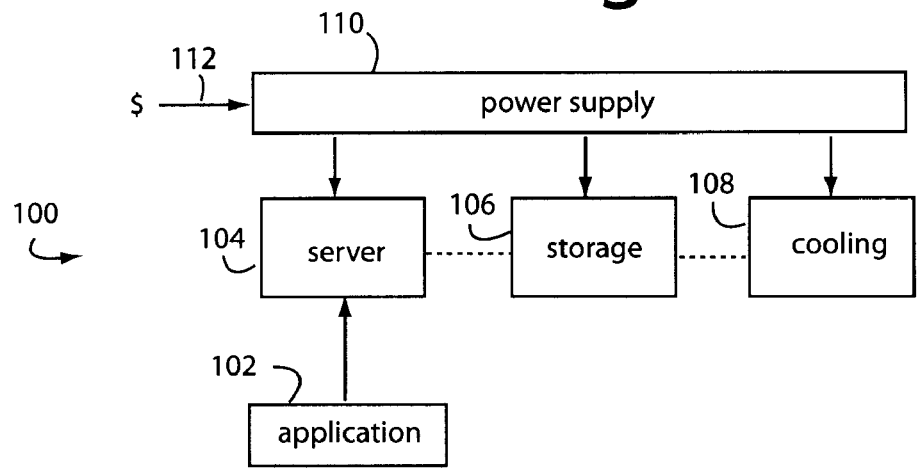
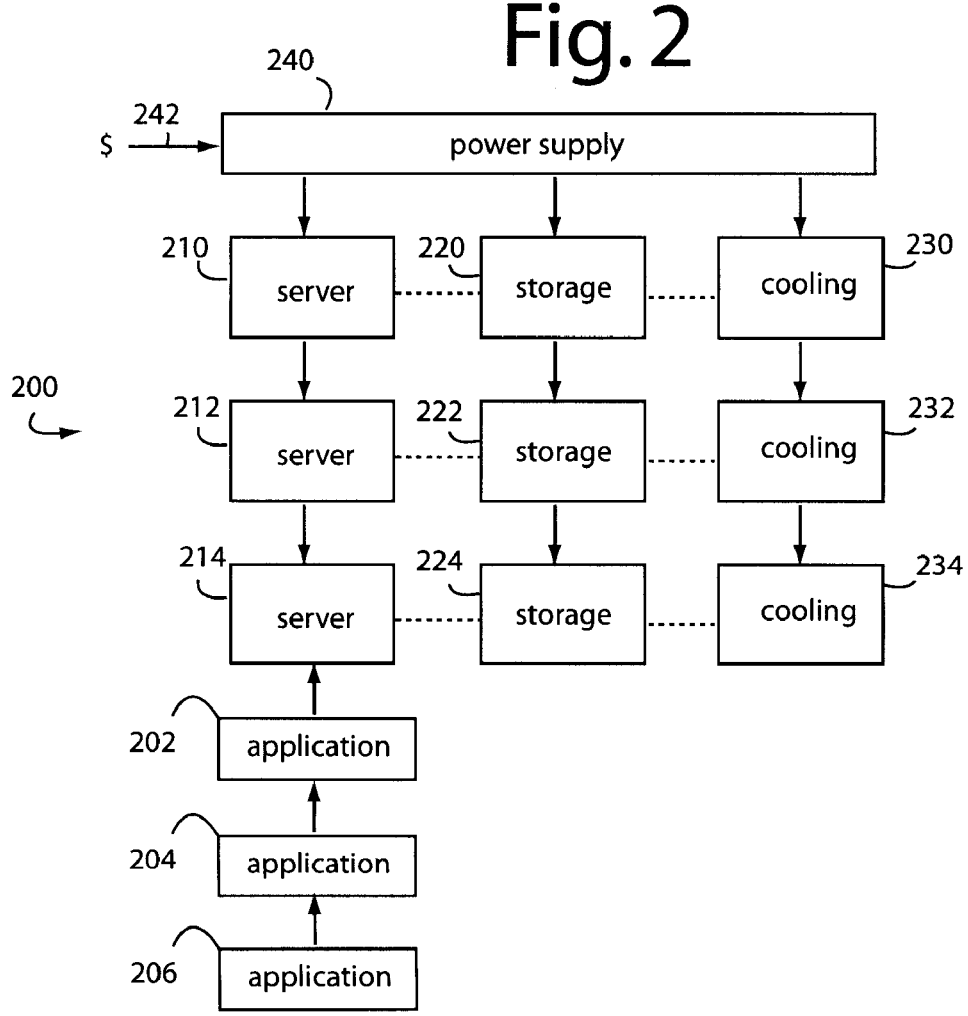

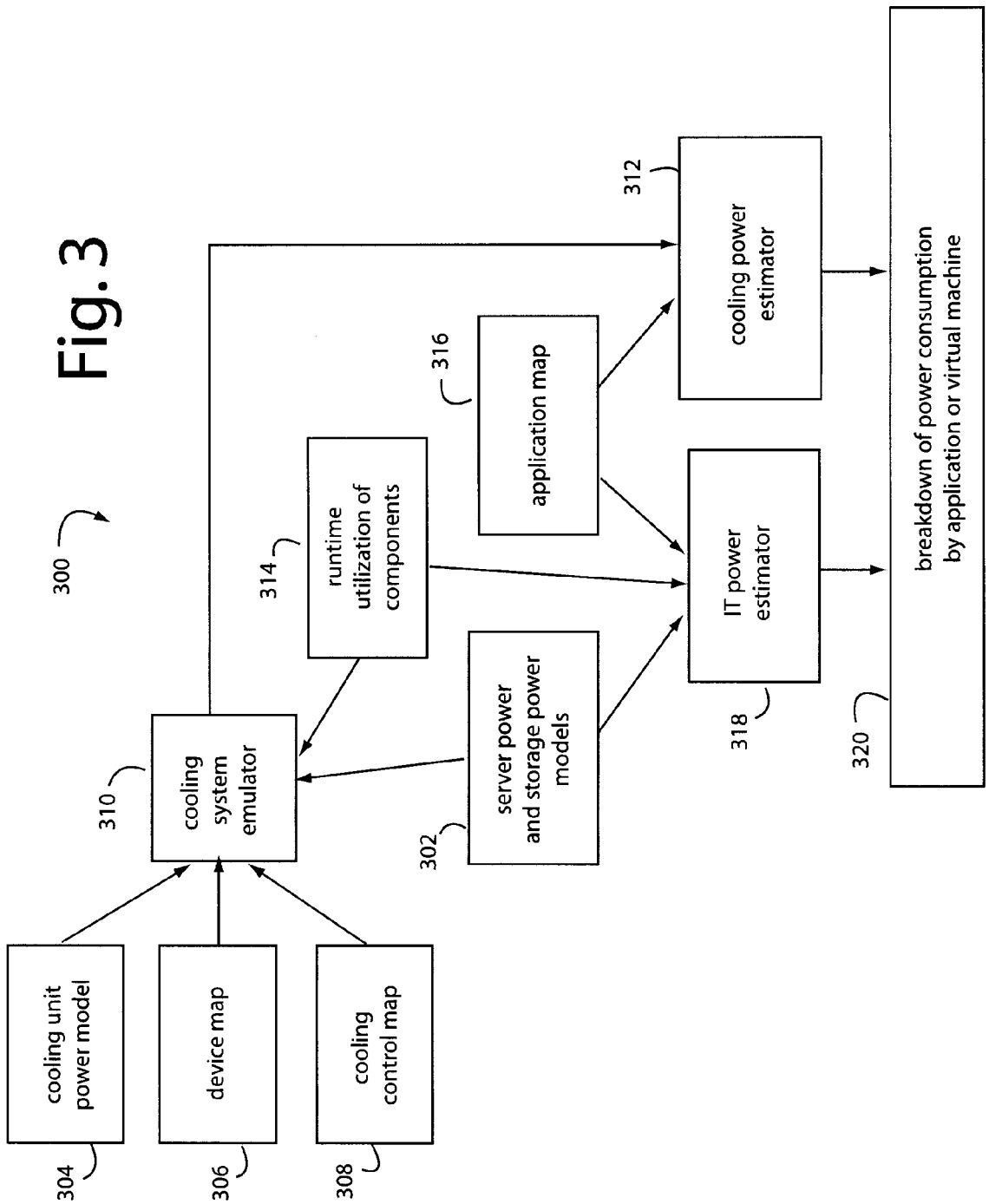

DATA CENTER POWER COST ACCOUNTING SYSTEM

BACKGROUND OF THE INVENTION

1. Field of the Invention

Embodiments of the present invention relate to computer application power consumption measurement, and in particular to estimating the power consumption of an application on a distributed mix of computer resources, servers and storage in a data center.

2. Background Information

The electrical power consumption costs of computer datacenters has been growing steadily and is a significant part of an enterprise's operating costs. Besides generally controlling and limiting all costs, the actual runtime costs of particular program applications being run need to be accounted for and charged to the corresponding customers, projects, and departments. One goal in systems management is being able to correlate the power consumption of data center servers, storage, and cooling to individual applications even though they run on a mix of resources.

Power consumption of an electrical appliance can be measured simply and directly by a discrete electrical instrument, such as a power meter. But the measurement of the power consumption of the individual constituent components of a computer system is far less practical and affordable.

At idle, computer systems and data storage units will typically draw a consistent, steady current. It isn't until the operating system and application programs are run on them that the power consumption goes up.

Modern computer systems can run multiple applications at the same time, and the work for those applications can be distributed across many discrete resources. Even if hardware could be employed to measure the power consumption of each of these component resources in real time, it would be difficult to determine how much power was being consumed by each particular application when more than one application is running.

Being able to gauge how much power is being consume, or will be consumed by each application is important to being able to track operational costs, resource capacity, and cooling demands. It can also be key to resource planning and job prioritization. Some of the best electrical power rates can be had if the peak power demands of the computer resources are limited to contracted maximums.

BRIEF SUMMARY

According to one general embodiment, a data center power cost accounting system that comprises a server and storage equipment estimator with inputs for an application map and a utilization of components in a data center, and a program for determining a total component power per application, wherein the accuracy of an output computation depends on the quality of any power consumption models used and the granularity of utilization information input; a cooling power estimator with an input for a cooling cost estimate provided by a cooling system emulator and a program to determine a cooling cost per application, wherein for a given component, a computed cooling cost is a function of the ratio of component heat to the sum of component heat of all components in a zone and the overall cooling cost of the zone. The system also includes a system output calculation that includes a per application accounting based on utilization history, power consumed by all systems running the application, and the cooling cost incurred by all components running the application.

In another embodiment, a method for data center power cost accounting that comprises determining a total component power per application with a server and storage equipment estimator that takes an application map and a utilization of components in a data center as its inputs and depends on the quality of any power consumption models used and the granularity of utilization information; determining a cooling cost per application with a cooling power estimator that inputs a cooling cost estimate provided by a cooling system emulator, wherein for a given component, the cooling cost is a function of ratio of component heat to sum of component heat of all components in a zone and the overall cooling cost of the zone. The method further includes outputting a per application accounting based on utilization history, power consumed by all systems running the application, and the cooling cost incurred by all components running the application.

According to another general embodiment, a computer program product to account data center power cost. The computer usable program code comprise computer usable program code configured to determine a total component power per application with a server and storage equipment estimator that takes an application map and a utilization of components in a data center as its inputs and depends on the quality of any power consumption models used and the granularity of utilization information; computer usable program code configured to determine a cooling cost per application with a cooling power estimator that inputs a cooling cost estimate provided by a cooling system emulator, wherein for a given component, the cooling cost is a function of ratio of component heat to sum of component heat of all components in a zone and the overall cooling cost of the zone. The computer program product also comprises computer usable program code configured to output a per application accounting based on utilization history, power consumed by all systems running the application, and the cooling cost incurred by all components running the application.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which:

FIG. 1 is a functional block diagram of a simple data center embodiment;

FIG. 2 is a functional block diagram of a multi-application, multi-server, multi-storage, multi-cooling zone data center embodiment; and FIG. 3 is a flowchart diagram of a data center power cost accounting system embodiment useful in the datacenters of FIGS. 1 and 2.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 represents a data center 100 that runs program applications 102 on servers 104 with associated storage 106 and cooling 108. A power supply 110, such as a utility, supplies operating power at a cost ($) 112 to the servers 104, storage 106, and cooling 108. It is this operational cost that can be pegged to the running of a single application that is of interest herein.

In one embodiment, at least one program application 102 can be used to allocate the operational information-technology (IT) power and cooling costs 112 of data center 100 amongst all the applications 102 it supports, and without resorting to hardware instrumentation. In one embodiment, such program application 102 is a purely a software-based monitoring and modeling solution.

In a data center 200 in FIG. 2, it is assumed that many applications (X) 202, 204, 206, execute on distributed sets of computer resources and servers 210, 212, 214, and they can independently access data in consolidated or distributed storage 220, 222, 224. Cooling zones are provided by cooling units 230, 232, 234. Multiple applications 202, 204, 206 can execute concurrently on a single server, and a single application can have its computer load distributed across multiple servers. These loads will increase the heat generated by the servers ultimately handling the load, and that heat is taken away by the cooling unit responsible for the corresponding zone. In such systems, an application's power consumption is the sum of server, storage and cooling resources it uses. This power consumption is represented here, in part, by power supply 240 and the costs ($) 242 of the power consumed in data center 200.

Improvements in virtualization technologies have lead to consolidation of resources. In the context of a data center, consolidation amounts to running multiple applications as virtual machines (VM) on same hardware machines. In order to estimate power usage accurately, fine grained utilization information for the various components of a data center is needed. The total power cost (XTotal) for running an application X in a data center 100 or 200 can be mathematically modeled as the sum of the incremental server cost (XPserver), the storage cost (XPstorage), and the cooling cost (XPcooling), $$X_{Total} = X_{Pserver} + X_{Pstorage} + P_{cooling}(X). \tag{1}$$

In a shared system, like data center 200, the utilization of the system is then the sum of the applications 202, 204, 206, and the virtual machines they run on, $$System_U = U_x + U_y + \tag{2}$$

Looking first at the server cost, for any given application X running on serveri, the server power consumed in running application X is, $$X_{P_{server_i}} = \frac{U_x}{\sum_{all} U_{apps}} + P_{servers_i}. \tag{3}$$

An additional summation is needed to account for the power consumption on multiple server nodes of applications that use distributed computer resources, $$X_{P_{server_i}} = \sum_{X \in i} \frac{U_x}{\sum_{all} U_{apps}} * P_{servers_i}. \tag{4}$$

The power efficiency is a function of the load on the system, and it is typically directly proportional to the load. However, the slope will depend on the particular server. The power consumption of a server node is then, $$P_{server} = \frac{(P_{cpu} + P_{memory} + P_{others})}{PSE(System_U)}. \tag{5}$$

The power consumption of a CPU alone is a function of the utilization or load on the CPU. At idle, the power consumption of CPUs is steady. The power consumption increases by a variable component when the CPUs are doing useful work, e.g., $$P_{cpu}(U_{cpu}) = P_{cpu_{idle}} + (P_{cpu_{max}} - P_{cpu_{idle}}) + U_{cpu}. \tag{6}$$

The maximum power consumption of a CPU is related to the frequency times the square of the voltage at which the CPU hardware is operated, times a constant k2.

$$P_{cpu_{max}} = k_2 * frequency * voltage^2. \tag{7}$$

The power consumption of a server at idle is typically some fraction, k1, of the maximum power consumption, e.g., $$P_{cpu_{idle}} = k_1 * P_{cpu_{max}}. \tag{8}$$

Looking at the storage cost, for any application X (202, 204,206) using storage resource i (220,222,224), the power consumption is the sum of the power spent in servicing requests and the power depleted while in idle mode, as in, $$X_{P_{storage_i}} = (SP_{disk_i}(X) + IP_{disk_i}(X)). \tag{9}$$

$SP_{disk}(X)$ is the power spent in doing real input-output operations on behalf of application X. $SP_{disk}(X)$ is a function of the disk utilization due to application X, plus a constant representing the power consumed on regular disk input-output, e.g., $$SP_{disk}(X) = D_U * P_{service}. \tag{10}$$

IPdisk(X) is the power consumption at idle that can be attributed to an application X. The idleness of a disk depends on the access patterns of other applications that share the same disk. The idle power is modeled herein as a function of the application, $$IP_{disk}(X) = (1 - D_{UTotal}) * P_{idle} * \frac{sizeof(X)}{TotalSpace}. \tag{11}$$

The power consumption $X_{P_{storage}}$ for an application X using multiple storage resources is the summation across all the resources used, $$X_{P_{storage}} = \sum_{X \in i} (SP_{disk_i}(X) + IP_{disk_i}(X)). \tag{12}$$

For cooling cost, the model is non-trivial due to complex behavior of cooling systems and air flows. Computational fluid dynamics models can be used to approximate the cooling cost of an entire data center, or a specific zone in the data center. The cost is broken down according to the applications deployed. Differences in temperature at different points in the data center occur as a result of inefficiencies in the cooling system design, or uneven workload distributions. The cooling cost for the equipment that is used to run any given application X is estimated. In general, particular cooling units are associated with certain physical zones. The servers in each zone are identified, and the power cost incurred by each cooling unit is determined. The cooling cost for an application is, $$P_{cooling}(X) = \sum_z \left( \frac{\sum_{m \in z} X_{P_{server_m}} + X_{P_{storage_m}}}{\sum_{m \in z} X_m} * E(CoolingPower_{zone_z}) \right). \tag{13}$$

An estimate of the cooling demand expected for each zone can be obtained with computational fluid dynamics (CFD) simulations. An approximation of cooling cost over a period of time for any given application can be pieced together by adding up the equipment utilized by the application and applying the cooling estimates obtained from the simulations. The cooling estimates can further account for changes or variability in resource usage over time since the cooling estimates are based directly on utilization.

FIG. 3 represents a data center power cost accounting system embodiment, and is referred to here by the general reference numeral 300. System 300 includes power consumption models 302 for the servers and storage units, cooling unit power models 304, a device map 306, and a cooling control map 308. All these models and maps are fed to a cooling system emulator 310 which provides cooling information to a cooling power estimator 312. The cooling system emulator 310 takes as input the physical layout of components, the physical layout and control of cooling components, and the overall utilization of all components. It determines a temperature profile and cooling power consumption, using models of components to convert utilization to heat generated.

The physical layout of the IT equipment and the cooling equipment are provided in the device map 306 and cooling control map 308. The power consumption models 302 take utilization as an input and determine expected power consumption. Simple single linear models can be used in less complex situations, or composite models can be built that account for every component of the server or storage, or include step wise behavior, or use fixed components for idle power and variable linear components based on utilization.

For storage models, both the disk and controller power consumption are modeled. Information Lifecycle Management (ILM) requirements (archive/tape storage) can be used to model power consumption of different tiers. The cooling power model 304 models cooling power consumption as a function of the incoming hot air temperature and the outgoing cold air supply temperature. The ratio of the amount of heat removed to the work done is the coefficient of performance (COP) and increases with higher plenum supply temperatures.

A runtime utilization of components schedule 314 and an application map 316 are enough to allow an IT power estimator 318 and cooling power estimator 312 to produce a breakdown 320 of the power consumption of each application or virtual machine running on the data center. The application map 316 maps the individual applications to the servers and storage systems they use during runtime. The device map 306 maps the devices to their physical coordinates, e.g., obtained automatically with RFID tags or manually. For example, the device name/ID and rack number, or XYZ coordinate. The cooling control map 308 maps the rack/aisles to the respective cooling units.

The power consumption models 302 for the servers and storage units, cooling unit power models 304, a device map 306, and a cooling control map 308, represent the input data required for the cost accounting of the data center's applications power consumption. The applications are mapped to their respective physical resources, e.g., the servers and storage units.

The IT estimator 318 and cooling power estimator 312 together computer the total power cost (XTotal) for running an application X in a data center 100 or 200. It is mathematically modeled as the sum of the incremental server cost (XPserver), the storage cost (XPstorage), and the cooling cost (XPcooling), e.g., XTotal=XPserver+XPstorage+Pcooling (X). The IT estimator 318 takes the application map 316 and utilization of components 314 as its inputs, and determines total component power per application. Its accuracy depends on the quality of the server and storage models 302 and the granularity of utilization information.

Application map 316 describes the mix of servers or virtual machines 210, 212, 214 the applications 202, 204, 206, are run on, as in SystemU=Ux+Uy+... The server power and storage models 302 describe the power cost for each server i. The power consumed in running application X on one server is, $$X_{P_{server_i}} = \frac{U_x}{\sum_{all} U_{apps}} + P_{servers_i}.$$

For the power consumption on all server nodes 210, 212, 214 used by an application (X) 202, 204, 206, it follows, $$X_{P_{server_i}} = \sum_{X \in i} \frac{U_x}{\sum_{all} U_{apps}} * P_{servers_i}.$$

The power consumption models 302 for the servers assume the power consumption of a CPU alone is a function of the utilization or load on the CPU. At idle, the power consumption of CPUs is steady. The power consumption increases by a variable component when the CPUs are doing useful work, e.g., $P_{cpu}(U_{cpu})=P_{cpu_{idle}}+(P_{cpu_{max}}-P_{cpu_{idle}})+U_{cpu}$. And, the maximum power consumption of a CPU is related to the frequency times the square of the voltage at which the CPU hardware is operated, times a constant k2, $$P_{cpu_{max}} = k_2 * frequency * voltage^2.$$

The power consumption models 302 for the storage units assume for any application X (202,204,206) using storage resource i (220,222,224), the power consumption is the sum of the power spent in servicing requests and the power depleted while in idle mode, as in, $$X_{P_{storage_i}} = (SP_{disk_i}(X) + IP_{disk_i}(X)).$$

$SP_{disk}(X)$ is the power spent in doing real input-output operations on behalf of application X. $SP_{disk}(X)$ is a function of the disk utilization due to application X, plus a constant representing the power consumed on regular disk input-output, $SP_{disk}(X)=D_U*P_{service}$. Included in IPdisk(X) is the power consumption at idle that can be attributed to application X. The idleness of a disk depends on the access patterns of other applications that share the same disk. The idle power is modeled herein as a function of the application, $$IP_{disk}(X) = (1 - D_{UTotal}) * P_{idle} * \frac{sizeof(X)}{TotalSpace}.$$

The power consumption $X_{P_{storage}}$ for an application X using multiple storage resources 220, 222, 224, is the summation across all the resources used, $$X_{P_{storage}} = \sum_{X \in i} (SP_{disk_i}(X) + IP_{disk_i}(x)).$$

The cooling power estimator 312 uses a cooling cost estimate provided by the cooling system emulator 310 to determine the cooling cost per application. For a given component, cooling cost is a function of ratio of component heat to sum of component heat of all components in the "zone" and the overall cooling cost of the zone.

In one embodiment, the cooling cost depends on computational fluid dynamics (CFD) simulations and models used in cooling system emulator 310 to approximate the cooling of the entire data center, or a particular zone (z) in the data center.

An approximation of cooling cost over a period of time for any given application can be pieced together by adding up the equipment utilized by the application and applying the cooling estimates obtained from the simulations. The cooling estimates can further account for changes or variability in resource usage over time since the cooling estimates are based directly on utilization. The cost is broken down according to the applications 202, 204, 206, deployed. The cooling cost for the equipment that is used to run any given application X is estimated by cooling power estimator 312. Particular cooling units are associated with certain physical zones by cooling control map 308. The servers in each zone are identified, and the power cost incurred by each cooling unit is determined in cooling unit power model 304. The cooling cost for an application is, $$P_{cooling}(X) = \sum_{z} \left( \frac{\sum_{m \in z} X_{P_{server_m}} + X_{P_{storage_m}}}{\sum_{m \in z} X_m} * E(CoolingPower_{zone_z}) \right).$$

The breakdown 320 of the power consumption for each application 202, 204, 206, produces the cost accounting information needed to allocate operational runtime costs to the responsible customer, project, or department. And the per application power consumption costs are obtained without having to install or depend on power measurement instruments or other hardware in the datacenters.

While the invention has been described with reference to several particular example embodiments, those skilled in the art will recognize that many changes may be made thereto without departing from the spirit and scope of the invention, which is set forth in the following claims.

What is claimed is:

1. A data center power cost accounting system, comprising:
   a server and storage equipment estimator with inputs for an application map and a utilization of components in a data center, and a program for determining a total component power per application, wherein the accuracy of an output computation depends on the quality of any power consumption models used and the granularity of utilization information input;
   a cooling power estimator with an input for a cooling cost estimate provided by a cooling system emulator and a program to determine a cooling cost per application, wherein for a given component, a computed cooling cost is a function of the ratio of component heat to the sum of component heat of all components in a zone and the overall cooling cost of the zone; and
   a system output calculation that includes a per application accounting based on utilization history, power consumed by all systems running the application, and the cooling cost incurred by all components running the application.

2. The system of claim 1, further comprising:
   an application map of how particular applications are related to at least one server and storage system;
   a cooling control map that indexes which particular cooling units are associated with certain physical zones, and the servers in each zone are identified;
   a cooling unit power model for aid in calculating a power cost incurred by each cooling unit; and
   a device map in which each server and storage system is mapped to its physical coordinates.

3. The system of claim 1, further comprising:
   a set of power consumption models that include utilization as an input and determine expected power consumption, and that allow a choice between simple single linear models for less complex situations, and composite models that account for every component of the server or storage.

4. The system of claim 3, wherein at least one model uses fixed components for idle power and variable linear components based on utilization.

5. The system of claim 3, wherein at least one storage model includes both the disk and controller power consumption, and Information Lifecycle Management (ILM) requirements are used to model the power consumption of different tiers.

6. The system of claim 1, further comprising:
   a cooling power model to model cooling power consumption as a function of an incoming hot air temperature and an outgoing cold air supply temperature, wherein the ratio of the amount of heat removed to the work done is the coefficient of performance (COP) and increases with higher plenum supply temperatures.

7. The system of claim 1, further comprising:
   a cooling system emulator that takes as input the physical layout of components, the physical layout and control of cooling components, and the overall utilization of all components, and that determines a temperature profile and cooling power consumption, using models of components to convert utilization to the heat generated.

8. The system of claim 1, further comprising:
   a runtime utilization of components schedule which relates particular servers and storage systems used during runtime to individual applications.

9. A method for data center power cost accounting, comprising:
   determining a total component power per application with a server and storage equipment estimator that takes an application map and a utilization of components in a data center as its inputs and depends on the quality of any power consumption models used and the granularity of utilization information;
   determining a cooling cost per application with a cooling power estimator that inputs a cooling cost estimate provided by a cooling system emulator, wherein for a given component, the cooling cost is a function of ratio of component heat to sum of component heat of all components in a zone and the overall cooling cost of the zone; and
   outputting a per application accounting based on utilization history, power consumed by all systems running the application, and the cooling cost incurred by all components running the application.

10. The method of claim 9, further comprising:
    mapping particular applications to at least one server and storage system;
    associating particular cooling units with certain physical zones, and identifying the servers in each zone;
    determining the power cost incurred by each cooling unit; and
    mapping each server and storage system to its physical coordinates.

11. The method of claim 9, further comprising:
    modeling power consumption by taking utilization as an input and determining expected power consumption, and including either simple single linear models for less complex situations, or composite models that account for every component of the server or storage.

12. The method of claim 9, further comprising:
including both the disk and controller power consumption, and Information Lifecycle Management (ILM) requirements to model the power consumption of different tiers.

13. The method of claim 9, further comprising:
modeling cooling power consumption as a function of incoming hot air temperatures and the outgoing cold air supply temperatures, wherein the ratio of the amount of heat removed to the work done is the coefficient of performance (COP) and increases with higher plenum supply temperatures.

14. The method of claim 9, further comprising:
emulating a cooling system by taking as input the physical layout of components, the physical layout and control of cooling components, and the overall utilization of all components, and determining a temperature profile and cooling power consumption, and using models of components to convert utilization to the heat generated.

15. A computer program product, comprising:
a computer usable medium having computer usable program code embodied therewith, the computer usable program code configured to account data center power cost, the computer usable program code comprising:
   computer usable program code configured to determine a total component power per application with a server and storage equipment estimator that takes an application map and a utilization of components in a data center as its inputs and depends on the quality of any power consumption models used and the granularity of utilization information;
   computer usable program code configured to determine a cooling cost per application with a cooling power estimator that inputs a cooling cost estimate provided by a cooling system emulator, wherein for a given component, the cooling cost is a function of ratio of component heat to sum of component heat of all components in a zone and the overall cooling cost of the zone; and
   computer usable program code configured to output a per application accounting based on utilization history, power consumed by all systems running the application, and the cooling cost incurred by all components running the application.

16. The computer program product of claim 15, further comprising:
   computer usable program code configured to map particular applications to at least one server and storage system;
   computer usable program code configured to associate particular cooling units with certain physical zones, and identifying the servers in each zone;
   computer usable program code configured to determine the power cost incurred by each cooling unit; and
   computer usable program code configured to map each server and storage system to its physical coordinates.

17. The computer program product of claim 15, further comprising:
   computer usable program code configured to model power consumption by taking utilization as an input and determining expected power consumption, and including either simple single linear models for less complex situations, or composite models that account for every component of the server or storage.

18. The computer program product of claim 15, further comprising:
   computer usable program code configured to include both the disk and controller power consumption, and Information Lifecycle Management (ILM) requirements to model the power consumption of different tiers.

19. The computer program product of claim 15, further comprising:
   computer usable program code configured to model cooling power consumption as a function of incoming hot air temperatures and the outgoing cold air supply temperatures, wherein the ratio of the amount of heat removed to the work done is the coefficient of performance (COP) and increases with higher plenum supply temperatures.

20. The computer program product of claim 15, further comprising:
   computer usable program code configured to emulate a cooling system by taking as input the physical layout of components, the physical layout and control of cooling components, and the overall utilization of all components, and determining a temperature profile and cooling power consumption, and using models of components to convert utilization to the heat generated.

* * * * *